United States Patent
Flickinger et al.

(10) Patent No.: US 8,437,715 B2
(45) Date of Patent: May 7, 2013

(54) MULTI-CARRIER-BASED TESTING

(75) Inventors: Jason A. Flickinger, Santa Clara, CA (US); Justin Gregg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 12/693,303

(22) Filed: Jan. 25, 2010

(65) Prior Publication Data
US 2011/0183637 A1    Jul. 28, 2011

(51) Int. Cl.
*H04B 1/18*    (2006.01)

(52) U.S. Cl.
USPC ..................... 455/150.1; 455/226.1

(58) Field of Classification Search ............... 455/67.13, 455/67.14, 114.1, 114.2, 114.3, 115.1, 127.2, 455/150.1, 226.1; 375/296, 297
See application file for complete search history.

(56) References Cited

U.S. PATENT DOCUMENTS

| | | | |
|---|---|---|---|
| 3,783,388 A | | 1/1974 | Disinger |
| 3,813,599 A | | 5/1974 | Campbell |
| 3,924,189 A | | 12/1975 | Campbell |
| 4,088,948 A | | 5/1978 | Miedema |
| 4,258,436 A | | 3/1981 | Campbell |
| 5,415,181 A | | 5/1995 | Hogrefe et al. |
| 6,205,220 B1 * | 3/2001 | Jacobsen et al. ............. 379/417 |
| 6,799,056 B2 | 9/2004 | Curley et al. |
| 7,550,977 B2 * | 6/2009 | Quan ............................ 324/622 |
| 7,957,478 B2 * | 6/2011 | Chalmers et al. ............. 375/260 |
| 7,961,891 B2 * | 6/2011 | Dorfman et al. ................ 381/58 |
| 2007/0053523 A1 * | 3/2007 | Iuliis et al. ...................... 381/77 |
| 2009/0215443 A1 * | 8/2009 | Dickey et al. ................ 455/424 |
| 2009/0298440 A1 * | 12/2009 | Takeya et al. .............. 455/67.14 |

OTHER PUBLICATIONS

Huoy, Sia Lih et al. "Digital Signal Processing Based Waveform Generator for Flickermeter Calibration Test System." 4th Student Conference on Research and Development, Malysia, p. 108-111, Jun. 27-28, 2006.

* cited by examiner

*Primary Examiner* — Ping Y Hsieh
*Assistant Examiner* — Chung-Tien Yang
(74) *Attorney, Agent, or Firm* — Treyz Law Group; Jason Tsai

(57) ABSTRACT

A device under test (DUT) may be connected to test equipment. The test equipment may include a multi-carrier signal generator and a host computer. The signal generator may provide a multi-carrier test signal that is fed to input-output devices of the DUT. The DUT may tune to a given radio channel on the test signal. The DUT may output an audio signal to the host computer to test for audio quality. Once desired measurements have been taken, the DUT may scan up or down to the next available radio channel on the test signal. The signal generator may not need to be reconfigured between scans, because the test signal contains multiple radio channels. The host computer may run a test program that directs a test program running on the DUT to perform the required tasks during testing.

18 Claims, 6 Drawing Sheets

MULTI-CARRIER-BASED TESTING

BACKGROUND

This invention relates to electronic devices, and more particularly, to testing electronic devices with wireless communications capabilities.

Wireless electronic devices may include radio-frequency tuners. For example, a wireless electronic device may have a frequency modulation (FM) radio tuner. An FM radio tuner allows an electronic device to selectively receive FM radio signals at specified radio frequencies. FM signals are radio-frequency signals that are generated by varying the frequencies of carrier waves depending on the strength of input signals that are to be transmitted.

FM radio stations broadcast audio material on respective FM radio channels. FM radio channels typically lie at frequencies ranging from 76 MHz to 108 MHz. Numerous FM radio stations broadcast material simultaneously. For example, a first radio channel at 94.9 MHz may broadcast a first set of FM radio signals while a second radio channel at 101.5 MHz simultaneously broadcasts a second set of FM radio signals.

During manufacturing, wireless electronic devices are typically tested for their ability to receive radio-frequency signals. For example, a device with an FM tuner can be tested to evaluate how well the device receives FM radio signals from various FM radio channels. A single-carrier (single channel) FM signal generator is commonly used to test this type of device. The single-carrier FM signal generator generates a test signal for a single radio channel at a time. In testing a wireless electronic device, the device is connected to the single-carrier FM signal generator and a host computer. To test performance at different portions of the FM band, the FM channel of the test signal can be varied while tuning the FM tuner in the device accordingly. While this type of arrangement is helpful in testing basic FM performance, it is unable to accurately simulate real-world conditions in which multiple channels are being broadcast simultaneously. Moreover, because a single-carrier signal generator can only generate one radio channel per test iteration, the signal generator must be reconfigured between each test run to test multiple radio channels.

The additional time required to set up the test equipment for each test channel can be significant when performing tests for a large number of radio channels.

It would therefore be desirable to be able to provide improved methods for testing wireless electronic devices for their ability to receive audio signals at various radio channels.

SUMMARY

A wireless electronic device with a radio tuner may be tested. When tested, the device may sometimes be referred to as a device under test (DUT).

A DUT may include storage and processing circuitry and input-output devices. A test operating system (OS) may be installed on the storage and processing circuitry. The test operating system or a test application that runs on a regular operating system may be used to run test code (i.e., a test program). The input-output devices of the DUT may include audio devices such as audio interface equipment (e.g., a female audio jack), a connector such as a 30-pin connector, and wireless communications circuitry.

The DUT may be connected to test equipment during radio testing. The test equipment may include a multi-carrier frequency modulation (FM) signal generator or other multi-channel radio transmitter and a host computer. The host computer may be used to control the signal generator and the DUT. The FM signal generator may be used to generate a multi-carrier test signal containing FM signals for multiple radio channels. FM signals, which are radio-frequency signals generated by varying the frequencies of a carrier wave depending on the strength of input signals to be transmitted, can be received by FM tuner circuitry in the wireless communications circuits of the DUT. Because radio performance can be tested in the presence of multiple test channels, real-world conditions in which multiple channels are present simultaneously may be accurately simulated. The ability of the device to perform functions such as channel scanning can also be tested.

Digital and analog radio may be conveyed using FM transmission schemes. The test equipment may therefore broadcast analog FM channels, digital FM channels, or combinations of analog and digital FM channels.

The test signals that are produced by the test equipment may contain multi-frequency audio test tones (e.g., test audio signals at multiple audio frequencies ranging from 50 Hz to 15 KHz). These test audio signals may be transmitted at various FM radio channels in the FM frequency band ranging from 76 MHz to 108 MHz.

The FM signal generator may contain a digital signal processor (DSP) and a digital-to-analog converter (DAC). The digital signal processor may generate the multi-carrier test signal in digital form. The digital output of the digital signal processor may be converted to an analog signal by the digital-to-analog converter.

The host computer may include storage and processing circuitry and an analog-to-digital converter (ADC). The storage and processing circuitry of the host computer may run a test program (code) that communicates with the test program of the DUT. The test code of the DUT and the host computer may communicate by sending information back and forth through a 30-pin connector or other input-output data port on the DUT. The test program of the host computer may send test commands to the test program of the DUT to direct the DUT to perform tasks during testing.

The DUT may have a three-contact female connector (e.g., an audio jack) with three electrical contacts such as first, second, and third contacts. There may be a corresponding three-contact male connector (e.g., audio plug) with three corresponding contacts. Connectors with fewer or more contacts may also be used. The audio plug may mate with the audio jack, so that the corresponding contacts form electrical connections in the mated state. A test signal cable carrying the multi-channel test signals that have been generated by the FM signal generator may be coupled to the audio plug. The corresponding audio jack may be connected to the wireless communications circuitry in the DUT.

The wireless communications circuitry may include a radio receiver having a radio tuner. During normal operation, FM signals may be received using an FM antenna coupled to the audio jack (e.g., using an FM antenna formed from a ground line in a headset). During testing, the radio receiver may use the audio jack to receive the multi-carrier test signals that are fed through the test signal path from the FM signal generator.

The radio tuner may be used to tune to a desired radio channel to produce a received audio signal. The received audio signal may then be fed to audio circuitry in the device. The audio circuitry may include an audio codec chip. The audio codec may decode audio signals by converting audio signals between digital and analog waveforms. The audio circuitry may include left and right amplifiers that output the received audio signals in analog form to contacts in the audio jack or contacts in other suitable input-output connectors.

Left and right contacts in the audio jack may be connected to left and right audio lines, respectively. The left and right audio lines may form an output signal path. The audio plug may have one portion that mates with the audio jack. The audio plug may have another portion connected to the host computer. Connected in this way, the host computer may be coupled to the output signal path and may obtain the audio signals that have been received by the FM tuner in the device. The received audio signals may be fed over the output signal path to an analog-to-digital converter in the host computer. The analog-to-digital converter can convert the received audio signals into a digital data stream for testing.

The digital data received by the host computer may be tested for audio quality. For example, signal-to-noise ratios (SNR), maximum output levels, frequency responses, crosstalk, and other characteristics of the received audio signals may be measured.

Once a desired amount of measurement data has been acquired for a given DUT at a given radio channel, the host device may direct the DUT to tune to a new radio channel (e.g., by scanning up/down until a next available radio channel is detected). The FM signal generator need not always be reprogrammed to provide a new radio channel between scans, because the FM signal generator provides a multi-carrier test signal that contains multiple radio channels. The multi-carrier test signal may be used to accurately simulate real-world radio-frequency signal environments that contain multiple simultaneously active channels and may therefore allow designers to test channel selectivity in the DUT.

Further features of the present invention, its nature and various advantages will be more apparent from the accompanying drawings and the following detailed description.

DETAILED DESCRIPTION

This relates generally to wireless communications, and more particularly, to testing electronic devices that have wireless communications capabilities such as portable electronic devices that contain radio tuners.

Portable electronic devices such as handheld media players, mobile telephones, laptop computers, and other devices often have radio tuners and other wireless communications circuitry. Radio tuners allow devices to tune to desired radio channels. Radio stations broadcast songs and other audio content in the form of radio-frequency (RF) signals. To test the ability of wireless electronic devices to tune to different radio channels, the audio quality of audio signals that are received by the devices can be measured as the devices are tuned to receive wireless signals from different radio channels.

Figure 1:
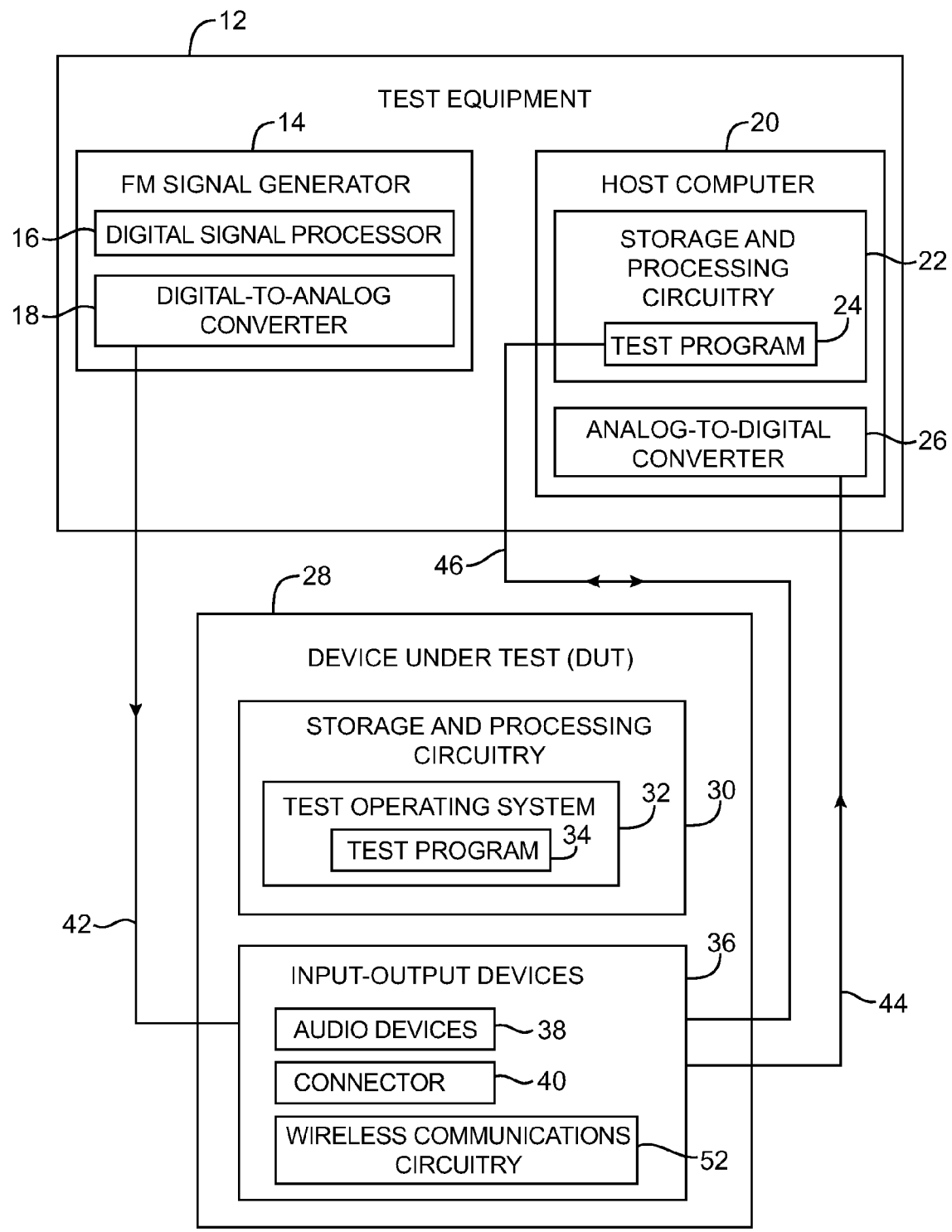
FIG. 1 is a schematic view of an illustrative test system that includes a device under test connected to test equipment in accordance with an embodiment of the present invention.

An illustrative test system that may be used to test the radio tuning capabilities of a wireless electronic device is shown in FIG. 1. Test system 10 may include test equipment such as test equipment 12. Equipment 12 may be connected to a device under test (DUT) such as DUT 28. DUT 28 may be any suitable type of wireless electronic device. For example, DUT 28 may be a portable media player with radio tuner circuitry, a portable computer with radio tuner circuitry, a cellular telephone with radio tuner circuitry, or other equipment that has the ability to receive radio signals.

Test equipment 12 may contain a signal generator such as multi-carrier frequency modulation (FM) signal generator 14. Equipment 12 may also generate amplitude modulation (AM) test signals or radio signals using other modulation techniques. Test scenarios involving FM signals are sometimes described herein as an example.

FM signal generator 14 may generate FM radio-frequency test signals. FM signals are radio-frequency signals that are generated by varying the frequency of a radio-frequency carrier signal depending on the strength of input signals that are to be transmitted. Analog and digital data can be carried over an FM carrier.

FM signal generator 14 may include digital signal processing circuitry such as digital signal processor (DSP) 16 and a digital-to-analog converter (DAC) such as digital-to-analog converter 18. Digital signal processor 16 and converter 18 may be used to produce a multi-carrier test signal. The multi-carrier test signal contains multiple FM radio channels. In contrast to single-carrier test signals (test signals for only one radio channel) that are used in conventional test processes, multi-carrier test signals may more accurately resemble real-world radio-frequency signals, because in practice, wireless signals almost always have multi-channel characteristics.

If desired, signal generator 14 may generate amplitude modulation (AM) signals (e.g., signals that are generated by varying the amplitudes of a carrier wave depending on the strength of input signals to be transmitted), HD Radio® signals, signals in pure digital form, hybrid digital-analog signals containing both digital and analog signals in respective radio channels, or other suitable radio test signals. Multi-carrier test signals generated for digital radio may be FM signals or AM signals.

Test equipment 12 may also include a host computer such as host computer 20. Host computer 20 may have storage and processing circuitry such as storage and processing circuitry 22 and an analog-to-digital converter (ADC) such as analog-to-digital converter 26. Storage and processing circuitry 22 may run a test program such as test program 24. Test program 24 may generate test commands that control test system 10. The test commands may be conveyed over control path 46. Analog-to-digital converter 26 may have an input terminal connected to a signal path such as output signal path 44. Output signal path 44 may carry analog audio signals (e.g., the same type of audio signals that are routed to headphones during normal use of DUT 28). Analog-to-digital converter 26 may convert the analog audio signals into digital data. The digital data that is converted by analog-to-digital converter 26 may then be fed to storage and processing circuitry 22 for further analysis (e.g., measurement or testing at the host computer).

Device under test (DUT) 28 may be connected to test equipment 12 using paths such as paths 42, 44, and 46. DUT 28 may include storage and processing circuitry such as storage and processing circuitry 30 and input-output (I/O) devices such as input-output devices 36. Storage and processing circuitry 30 may run a test operating system (OS) such as test operating system 32 or may be a standalone application (as examples). A test program such as test program 34 may be installed on DUT 28. Test program 34 may be part of test operating system 32. Test program 34 of DUT 28 may communicate with test program 24 of host computer 20 by sending information over control path 46. Test program 24 may, for example, send test commands to test program 34 directing DUT 28 to set initial settings, to adjust output power settings, to tune to a desired radio channel, to scan up or down to the next available channel, etc.

Test operating system 32 and test program 34 may only be used during device testing, if desired. For example, a device under test may have read-only memory (ROM) circuitry that is flashed (reprogrammed) with test operating system 32 for production testing purposes. If a device is deemed satisfactory after testing, the device may then be flashed with another operating system suitable for operating a device for sale to potential users. A final product (i.e., the device for sale) may not need to be flashed if test program 34 is hidden from the users (e.g., not accessible to users).

In another suitable arrangement, a test application may be installed on storage and processing circuitry 32 on DUT 28 during production testing. The test application may communicate with test program 24 that runs on host computer 20. The test application may communicate with test program 24 to control DUT 28 during testing. The test application may be deleted after a device has been tested. If desired, the test application may not need to be deleted if the test application is not accessible to users.

Test program 24 running on host computer 20 need not be used if test program 34 on DUT 28 can autonomously direct DUT 28 to perform desired test procedures. Test program 34 may therefore be able to direct DUT 28 to initialize with proper settings, to adjust volume settings, to tune and scan to desired radio channels, and to output received audio signals, without receiving instructions from host computer 20.

Input-output devices 36 in DUT 28 may contain audio devices such as audio devices 38, connectors such as connector 40, and wireless communications circuitry such as wireless communications circuitry 52. Audio devices 38 may include audio interface equipment having one or more input-output female connectors (e.g., audio jacks) for external headphones (as an example). Connector 40 may contain a 30-pin data port connector (as an example). Wireless communications circuitry 52 may include circuitry that receives radio-frequency signals (e.g., an FM tuner).

Input-output devices 36 may be coupled to test signal path 42. Input-output devices 36 may have an output terminal coupled to output signal path 44. DUT 28 may output audio signals it receives during testing onto output signal path 44. Output signal path 44 may be coupled to host computer 20. In general, DUT 28 may output received audio signals using either audio devices 38 (e.g., through an audio jack) or connector 40 (e.g., through two or more pins in a 30-pin connector).

Figure 2:
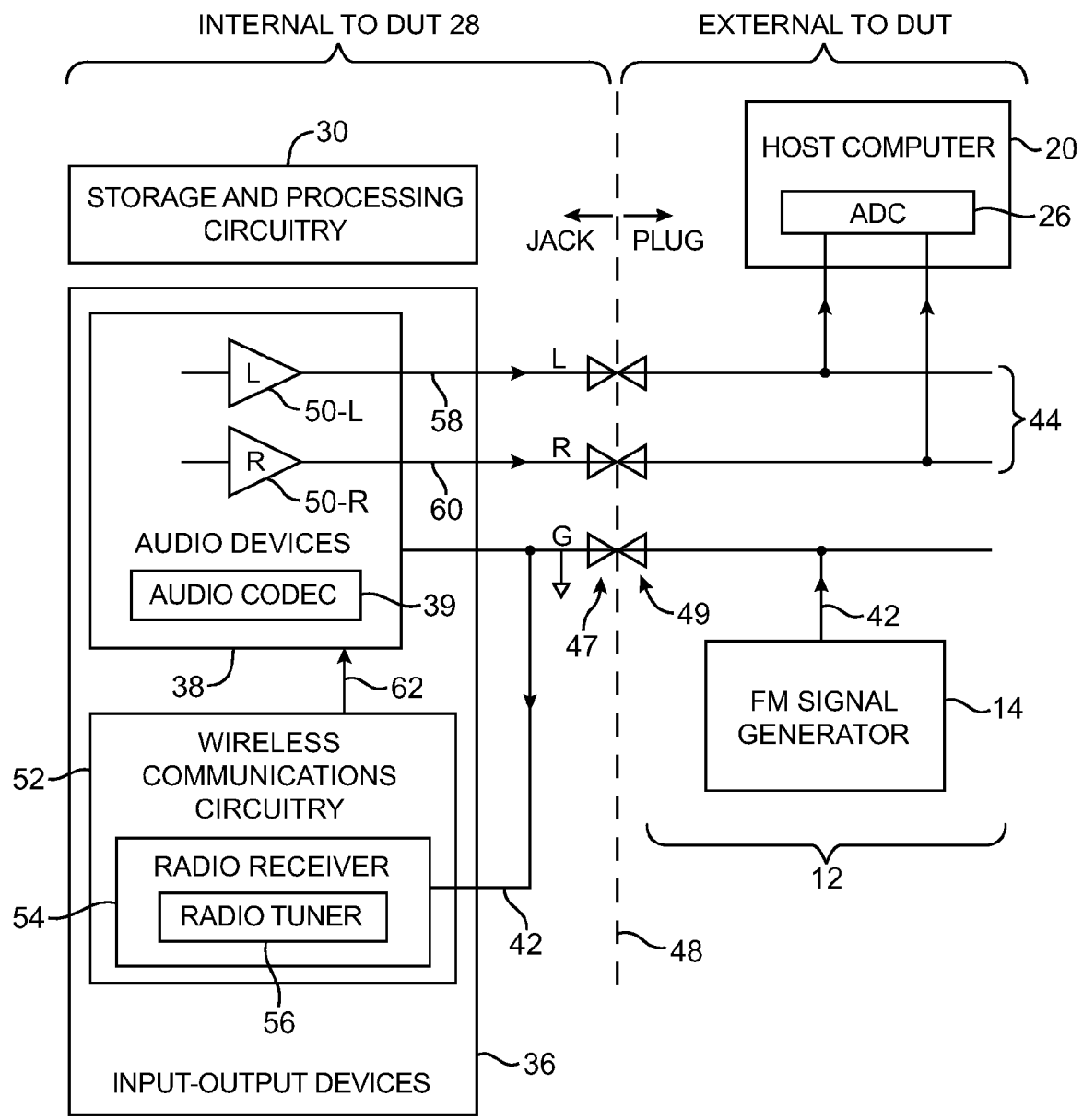
FIG. 2 is a schematic view of an illustrative test system showing detailed wiring that connects a device under test to test equipment in accordance with an embodiment of the present invention.

FIG. 2 shows one suitable type of arrangement that may be used to connect DUT 28 to test equipment 12. Audio devices 38 may include a female connector such as three-contact audio jack 47. Audio jack 47 may have first, second, and third electrical contacts. The first, second, and third contacts may be connected to a ground (G) line, left (L) audio line 58, and right (R) audio line 60, respectively.

The three-contact audio jack 47 may mate with a corresponding male connector such as three-contact audio plug 49. Audio plug 49 may have three corresponding electrical contacts that form electrical connections with the respective contacts of audio jack 47 in the mated state.

Doted line 48 may represent an interface at which audio jack 47 connects with audio plug 49. Components shown to the left of dotted line 48 are components internal to DUT 28 (e.g., coupled to the contacts of audio jack 47).

Components shown to the right of line 48 are components external to DUT 28 (e.g., coupled to the contacts of audio plug 49).

As shown in FIG. 2, wireless communications circuitry 52 may include a radio receiver such as radio receiver 54. Radio receiver 54 may include a radio tuner such as radio tuner 56. Radio receiver 54 may receive radio-frequency signals. Radio tuner 56 may tune the radio receiver to a specified frequency to selectively receive radio-frequency signals from a desired radio channel. Radio tuner 56 may, for example, be an FM radio tuner that can tune to desired FM radio channels.

Audio devices 38 may further include audio codec (coder-decoder) circuitry such as audio codec 39. Audio codec 39 may include a digital-to-analog converter and an analog-to-digital converter. Audio codec 39 may be capable of converting audio signals from an analog waveform to a digital data stream or from a digital data stream to an analog waveform. Audio codec 39 may be useful for processing digital radio broadcasts. For example, FM signal generator 14 may output a multi-carrier test signal. Radio receiver 54 may receive the multi-carrier test signal. Radio tuner 56 may tune the radio receiver to only receive radio-frequency signals from a given radio channel (e.g., by filtering out wireless signals at other frequencies). Signals on this channel may be sent to audio codec 39 so that codec 39 can produce an analog signal to supply to audio jack 47.

As an example, consider a scenario in which generator 14 produces a multi-carrier test signal that includes test channels at 80 MHz, 85.7 MHz, 93.1 MHz, and 101.9 MHz (i.e., corresponding to four FM radio channels). FM radio tuner 56 may be used to tune the radio station at 93.1 MHz. Test signals at other frequencies may be filtered out by tuner 56. The received 93.1 MHz channel may contain audible test tones (e.g., test tones in a frequency range from 50 Hz to 15 KHz). Audio signals generated in this way may be referred to as received audio signals.

During test, the received audio signal may be fed to audio devices 38 through path 62. Audio devices 38 may include amplifiers such as left amplifier 50-L and right amplifier 50-R. Amplifiers 50-L and 50-R may have output terminals connected to left and right audio lines 58 and 60, respectively. Lines 58 and 60 may be connected to the second the third contacts of audio jack 47. Lines 58 and 60 may form output signal path 44. Amplifiers 50-L and 50-R may drive audio output signals onto output signal path 44.

Output signal path 44 may be fed to audio jack 47. Audio jack 47 may be mated with corresponding audio plug 49. In the mated state, output signal path 44 may run through the audio plug cable to connect to host computer 20 (see, e.g., FIG. 2). Output signal path 44 may conduct audio output signals. The audio output signals may be fed to analog-to-digital converter 26. Analog-to-digital converter 26 may convert the audio output signals to digital data that can then be measured and analyzed by host computer 20. To summarize the signal flow, a test signal may originate at FM signal generator 14. The test signal is fed through the audio interface (e.g., a connection between audio plug 49 and audio jack 47) to the radio receiver. The radio receiver tunes to a particular one of the test channels in the test signal and provides a received audio signal. The received audio signal is output by audio devices 38 as an audio output signal. The audio output signal is then fed through the audio interface to host computer 20 for final testing.

Figure 3:
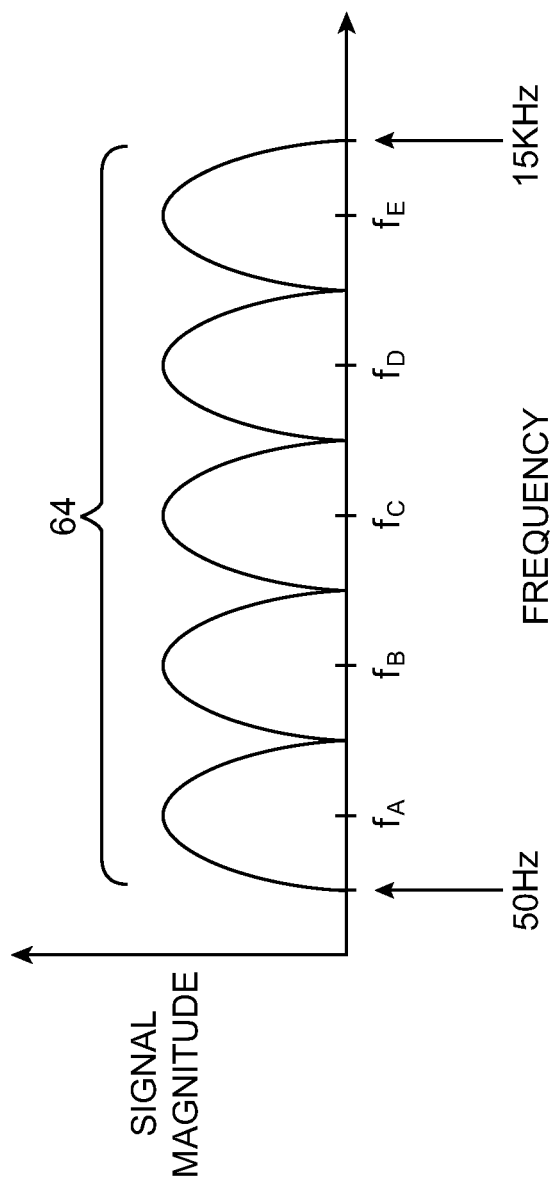
FIG. 3 is a graph of an illustrative multi-frequency test tone before upconversion to higher frequencies in accordance with an embodiment of the present invention.

A multi-frequency audio test tone such as multi-frequency test tone 64 of FIG. 3 may be generated by digital signal processor 16. In its un-modulated form (e.g., prior to frequency mixing or upconversion), multi-frequency test tone 64 may have non-zero signal magnitude in the audible frequency range from 50 Hz to 15 KHz, as shown in FIG. 3. Multi-frequency test tone 64 may have signal magnitude peaks at multiple frequencies. For example, multi-frequency test tone 64 may have five peaks at audio frequencies $f_A$, $f_B$, $f_C$, $f_D$, and $f_E$, respectively. Frequencies $f_A$-$f_E$ may be spaced equally apart or may be spaced at varying intervals from one another, if desired. The signal magnitude of multi-frequency test tone 64 may be negligible (e.g., close to zero) outside the audible frequency range.

Figure 4:
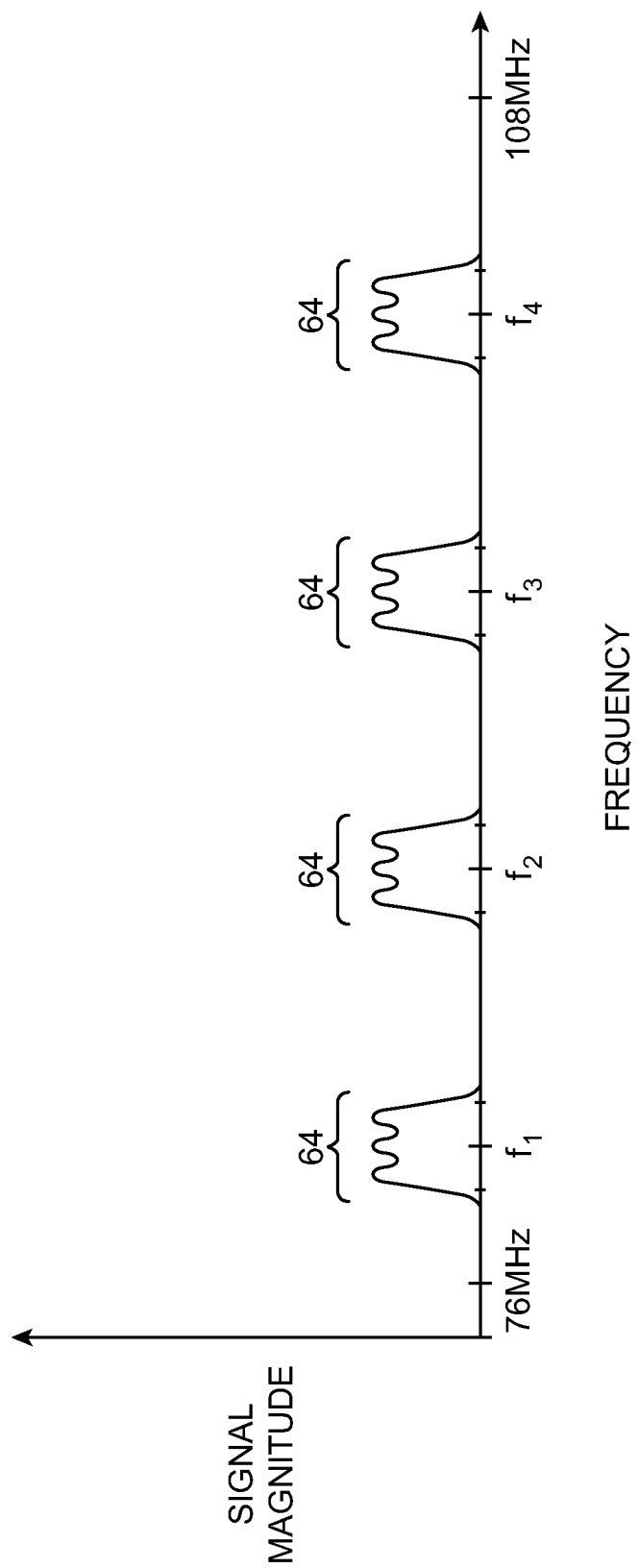
FIG. 4 is a graph of an illustrative multi-carrier test signal that is generated by a multi-carrier frequency modulation (FM) signal generator and that contains multi-frequency test tones of the type shown in connection with FIG. 3 at multiple FM radio channels in accordance with an embodiment of the present invention.

Digital signal processor 16 may then generate a test signal based on multi-frequency test tone 64. The test signal may have multi-frequency test tones 64 on multiple radio-frequency (radio) channels. For example, the test signal may have multi-frequency test tones 64 at four different radio-frequency carrier frequencies $f_1$, $f_2$, $f_3$, and $f_4$, as shown in FIG. 4. The four different frequencies $f_1$-$f_4$ may correspond to four different radio channels. The test signal may be an FM radio-frequency signal. FM signals are typically broadcast at a frequency band ranging from 76 MHz to 108 MHz. The four frequencies $f_1$-$f_4$ may therefore be located within this frequency range.

The differences between the frequencies may be unique to reduce undesired intermodulation interferences. For example, consider a scenario in which $f_1$, $f_2$, $f_3$, and $f_4$ are at 77 MHz, 87 MHz, 97 MHz, and 107 MHz, respectively. In the scenario above, the four radio channels at $f_1$-$f_4$ are evenly spaced apart (e.g., the difference between each successive frequency is equal to 10 MHz). Equal or unequal spacing may be used. Fewer than four test channels or more than four test channels may also be used.

A pair of radio-frequency carriers may produce undesired interference signals that are referred to as $3^{rd}$ order intermodulation (IM3) products. In the first scenario, test tones at $f_1$ and $f_2$ may create a first $3^{rd}$ order intermodulation product at 97 MHz (e.g., two times $f_2$ subtracted by $f_1$; (2*87)−77=97). Test tones at $f_2$ and $f_3$ may also create a second $3^{rd}$ order intermodulation product at 77 MHz (e.g., two times $f_2$ subtracted by $f_3$; (2*87)−97=77) and a third $3^{rd}$ order intermodulation product at 107 MHz (e.g., two times $f_3$ subtracted by $f_2$; (2*97)−87=107). Additionally, test tones at $f_3$ and $f_4$ may also create a fourth $3^{rd}$ order intermodulation product at 87 MHz (e.g., two times $f_3$ subtracted by $f_4$; (2*97)−107=87).

Note that the first, second, third, and fourth $3^{rd}$ order intermodulation products coincide with $f_3$, $f_4$, $f_1$, and $f_2$, respectively. These $3^{rd}$ order intermodulation products may therefore serve as undesired interference signals, because the intermodulation products fall directly on the radio channels of interest.

It may therefore be desirable to space the radio channels at unique frequency intervals (e.g., the difference between each successive frequency should be distinct from one another).

Consider another scenario in which $f_1$, $f_2$, $f_3$, and $f_4$ are at 77 MHz, 83 MHz, 93 MHz, and 101 MHz, respectively. In this scenario, the first and second radio channels are spaced 6 MHz apart, the second and third radio channels are spaced 10 MHz apart, and the third and fourth radio channels are spaced 8 MHz apart. Note that the spacing between each successive radio channel is unique.

In this example, test tones at $f_1$ and $f_2$ may create a first $3^{rd}$ order intermodulation product at 89 MHz (e.g., two times $f_2$ subtracted by $f_1$; (2*83)−77=89). Test tones at $f_2$ and $f_3$ may also create a second $3^{rd}$ order intermodulation product at 73 MHz (e.g., two times $f_2$ subtracted by $f_3$; (2*83)−93=73) and a third $3^{rd}$ order intermodulation product at 103 MHz (e.g., two times $f_3$ subtracted by $f_2$; (2*93)−83=103). Test tones at $f_3$ and $f_4$ may also create a fourth $3^{rd}$ order intermodulation product at 85 MHz (e.g., two times $f_3$ subtracted by $f_4$; (2*93)−101=85).

In this scenario, the first, second, third, and fourth $3^{rd}$ order intermodulation products in the second scenario do not coincide with any of the four radio channels in the second scenario. It may thus be desirable to configure radio channels in a multi-carrier test signal (e.g., analog or digital) in this way. The test signal shown in FIG. 4 is merely illustrative. Any number of radio channels may be generated. For example, a test signal may contain two, three, five, or more than five radio channels. Regardless of the number of radio channels that are provided on the multi-carrier test signal, it may be helpful to configure the radio channels such that intermodulation products do not interfere directly with any one of the radio channels.

Figure 5:
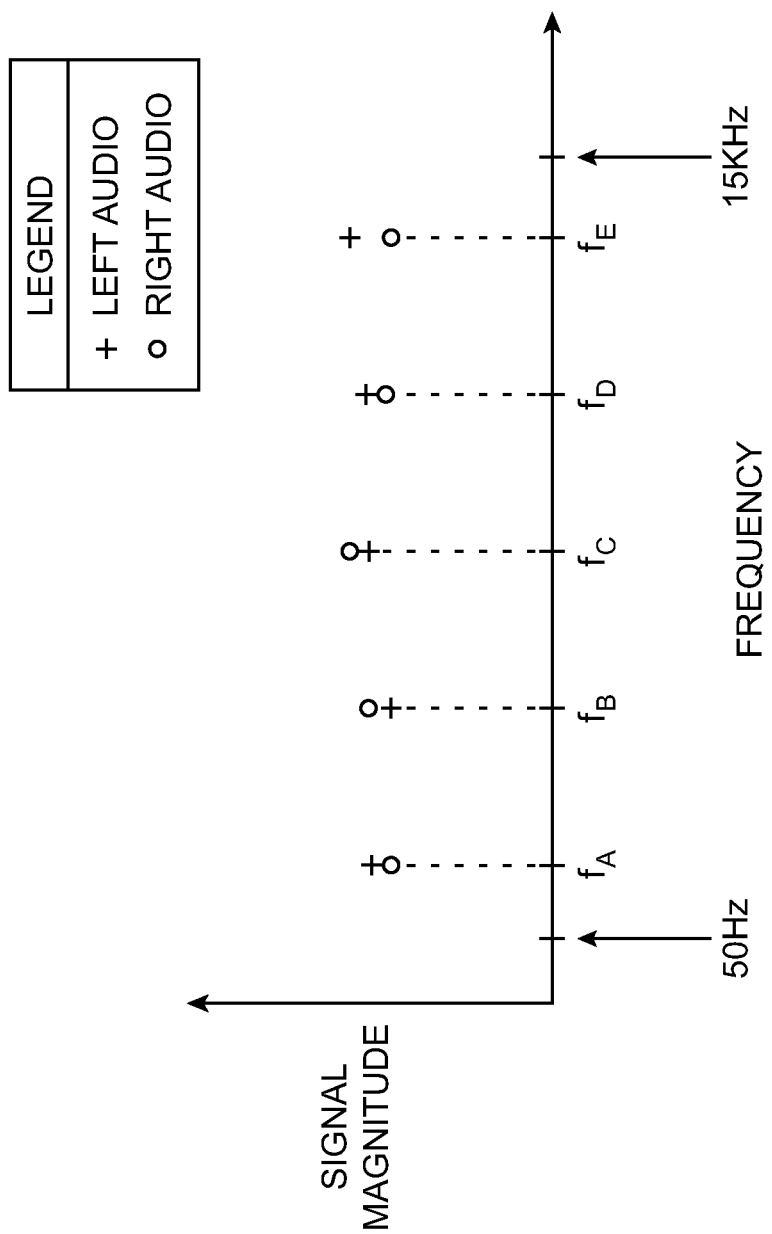
FIG. 5 is a graph of an illustrative measured audio signal that is measured by a host computer in accordance with an embodiment of the present invention.

FIG. 5 shows an illustrative frequency response of an audio output signal that is measured by host computer 20. Host computer 20 may measure the signal amplitude of the received audio signal at frequencies $f_A$-$f_E$ corresponding to the peaks of the original multi-frequency test tone generated by FM signal generator 14. Symbol "+" in FIG. 5 may indicate a measured audio signal amplitude provided on left audio line 58. Symbol "○" in FIG. 5 may indicate a measured audio signal amplitude provided on right audio line 60. The measured signal amplitude may differ slightly between the left and right audio lines. In addition to measuring frequency response, performance metrics such as signal-to-noise radio, audio channel crosstalk, and/or radio channel crosstalk (interference) can also be measured.

Figure 6:
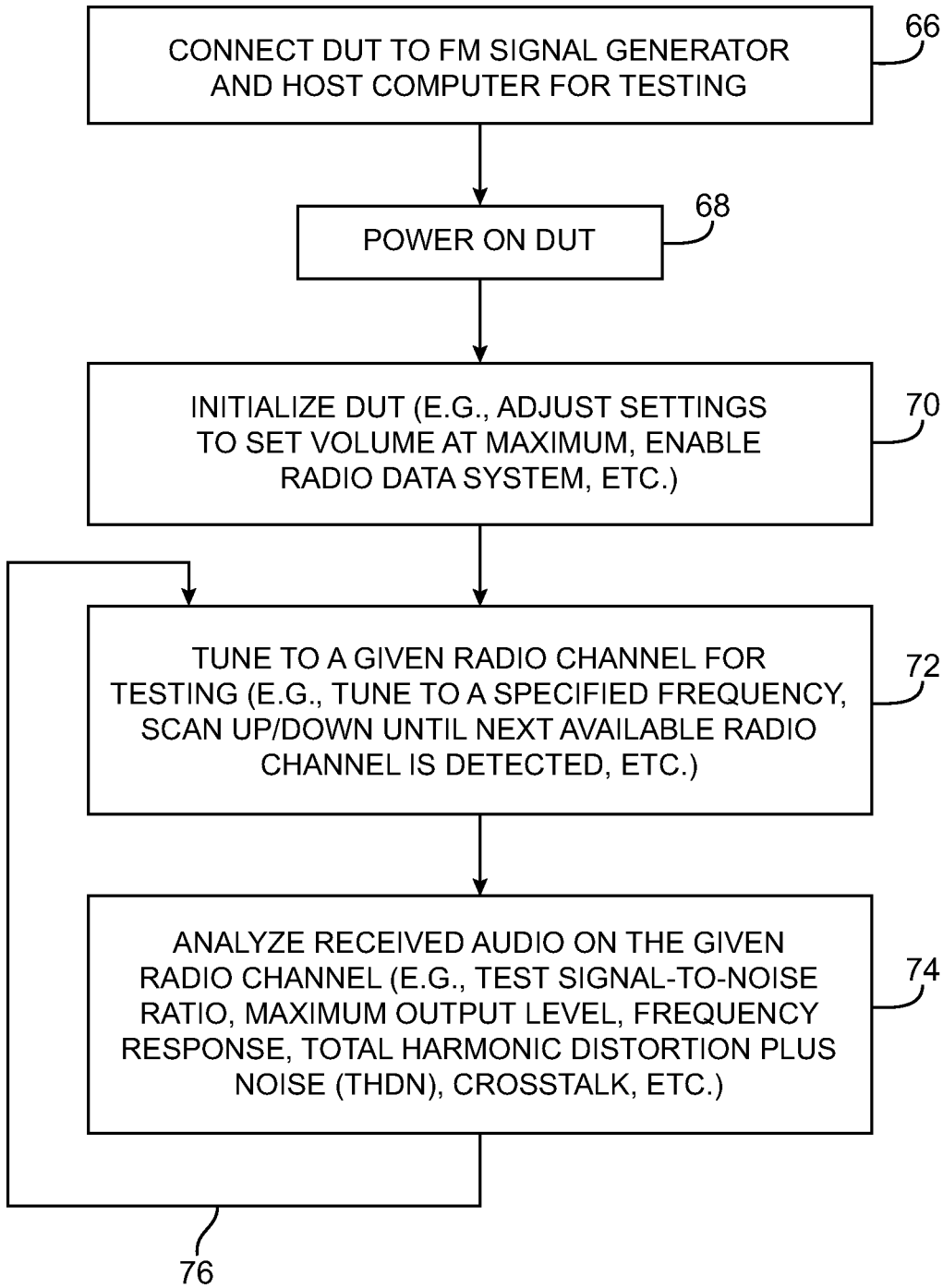
FIG. 6 is a flow chart of illustrative steps involved in testing a device under test with test equipment in accordance with an embodiment of the present invention.

Illustrative steps involved in testing DUT 28 are shown in FIG. 6. At step 66, DUT 28 may be connected to test equipment 12 (e.g., multi-carrier FM signal generator 14 and host computer 20). Once DUT 28 is connected to test equipment 12, DUT 28 may be powered on (step 68).

At step 70, host computer 20 may direct DUT 28 to run test program 34 (e.g., an operating system function, a test application, or other suitable test code). Running test program 34 may initialize DUT 28 by adjusting settings to set the output power (e.g., volume) of DUT 28 to a maximum level, to enable a radio data system (RDS) feature on DUT 28, etc. The volume may, for example, be set to an output level of −20.1 dBV (i.e., decibel representation of a voltage level with respect to one volt). Enabling RDS functionality may allow DUT 28 to extract relevant information in association with each radio channel (e.g., information such as radio channel frequency, radio channel name, etc.).

At step 72, DUT 28 may be tuned to a given radio channel for testing (e.g., DUT 28 may be tuned to a specified frequency by scanning up/down until a next available radio channel is detected or may be directly tuned to a specified frequency). After tuning to the given radio channel, host computer 20 may analyze the audio output signal broadcast by the given channel. For example, host computer 20 may measure a signal-to-noise ratio (SNR), a maximum output level, a frequency responses of the type described in connection with FIG. 5, a total harmonic distortion plus noise (THDN), crosstalk, etc.

SNR may refer to a ratio of a desired signal strength to peripheral noise amplitude. Maximum output level may refer the actual volume outputted by the device under test. For example, the device may be configured to output audio signals with an output level of −20.1 dBV, but the device may only actually only output audio signals with an output level of −23.7 dBV. THDN may refer to a ratio of a desired signal strength to peripheral noise amplitude in combination with all spurious harmonic signals (e.g., interference signals located at integer multiples of the frequency at which the desired signal is located). Crosstalk may refer an undesired effect in which signals traveling on the left audio line may induce transient disturbances for signals traveling on the right audio line. For example, in quantifying crosstalk, signal isolation between the left and right audio lines may be measured in terms of decibels. Because there are one or more radio channels present in the test signal in addition to the channel to which DUT 28 is currently tuned, real-world conditions are accurately replicated.

Measured results may be stored on host computer 20 for processing. After the measurements have been taken for the given radio channel, processing may loop back to step 72 to scan up or down for the next available radio channel, as indicated by path 76. In contrast to traditional test processes that require additional setup time necessary to reconfigure single-carrier test signals to a new radio channel per test iteration, it may not be necessary to reconfigure FM signal generator 14 during testing, because the test signal that multi-carrier FM signal generator 14 generates contains multiple radio channels.

It is important to note that host computer 20 may not explicitly specify what radio frequency DUT 28 tunes to next. DUT 28 may rely on radio tuner 56 to scan up/down and to detect a next available radio channel. An advantage of testing DUT 28 in this way is that the ability of DUT 28 to scan for arbitrary radio channels can be tested.

For example, consider a scenario in which a multi-carrier test signal contains first, second, third, and fourth radio channels. DUT 28 may be initialing tuned to the first radio channel. Measurements may be taken when DUT 28 is tuned to the first radio channel. Thereafter, DUT 28 may be directed by host computer 20 to scan for the next available radio channel. DUT 28 may detect the second radio channel and may tune to the second radio channel. Measurements may be taken when DUT 28 is tuned to the second radio channel. DUT 28 may again be directed by host computer 20 to scan for the next available radio channel. DUT 28 may detect the fourth radio channel and may tune to the fourth radio channel. Measurements may be taken when DUT 28 is tuned to the fourth radio channel. Host computer 20 may be able to discover that DUT 28 failed to detect the third radio channel. A DUT may fail to detect any one or any number of radio channels. This failure to detect a certain number of radio channels during scanning may be discovered by the host computer and may present useful information during production testing.

Also, channel selectivity of the DUT can be tested, because the DUT is essentially tuning to a specific radio channel while filtering out the other radio channels in the multi-carrier test signal. There may inevitably be interference signals such as intermodulation products located nearby each radio channel, so the ability of the DUT to attenuate these nearby noise sources may be of interest to test engineers as well.

For example, a test signal may be broadcast by FM signal generator containing a first radio channel at 81 MHz, a second radio channel at 91 MHz, and a third radio channel at 103 MHz. A device may use an FM radio tuner to tune to the third radio channel. There may be a pass-band filter centered at 103 MHz that strives to attenuate signals at other frequencies. There may be a $3^{rd}$ order intermodulation (IM3) product created by the first and second radio channels located at 101 MHz (e.g., two times 91 MHz subtracted by 81 MHz; (2*91)−81=101). The IM3 product is located only two megahertz away from the third radio channel. The pass-band filter may or may not be able to sufficiently attenuate the IM3 product. The ability of the pass-band filter to attenuate undesired signals such as the IM3 product may be referred to as channel selectivity.

Multiple DUTs 28 may be simultaneously connected to a common multi-carrier FM signal generator. Each DUT may run its own tests separately (e.g., testing does not need to be performed in a lock-step fashion) and may feed the results to a shared host computer. For example, consider a scenario in which first and second DUTs are being tested. The first DUT may be tuned to a first radio channel while the second DUT is tuned to a second radio channel that is different from the first radio channel. The second DUT may finish testing all desired radio channels before the first DUT and may be replaced by a third DUT that is to be tested.

The foregoing is merely illustrative of the principles of this invention and various modifications can be made by those skilled in the art without departing from the scope and spirit of the invention.

What is claimed is:

1. A test system for testing of a device under test that has a radio tuner and that has an audio jack having first, second, and third contacts that are respectively coupled to a ground line, a left audio line, and a right audio line, the test system comprising:
   a host computer that is configured to send test commands to the device under test via the second and third contacts of the audio jack; and
   a multi-carrier frequency modulation (FM) signal generator that is coupled to the device under test via the first contact of the audio jack, wherein the FM signal generator is configured to provide a multi-carrier test signal to the device under test, wherein the multi-carrier test signal contains at least first test signals in a first radio channel and second test signals in a second radio channel, and wherein the first and second test signals are simultaneously transmitted from the signal generator to the device under test.

2. The test system defined in claim 1, wherein the host computer comprises storage and processing circuitry that generates the test commands to the device under test during radio tuner testing.

3. The test system defined in claim 1, wherein the host computer is configured to send the test commands to the device under test while the device under test is tuned to the first radio channel and wherein the test commands direct the device under test to scan upwards in frequency to detect the second radio channel that is at a higher frequency than the first radio channel.

4. The test system defined in claim 3, wherein the host computer is configured to direct the device under test to tune to the second radio channel, wherein the host computer is configured to receive an audio output signal from the device under test while the device under test is tuned to the second radio channel, and wherein the host computer is configured to analyze audio quality for the audio output signal.

5. The test system defined in claim 1, wherein the host computer is configured to send the test commands to the device under test while the device under test is tuned to the first radio channel and wherein the test commands direct the device under test to perform an automatic frequency scan to locate the second radio channel.

6. The test system defined in claim 5, wherein the test command directs the device under test to tune the radio tuner from the first radio channel to the second radio channel.

7. A method of testing a portable electronic device that has a frequency modulation (FM) radio tuner using a multi-carrier frequency modulation (FM) signal generator and a host computer, the method comprising:
with the multi-carrier signal generator, providing a multi-carrier frequency modulation (FM) radio test signal to the portable electronic device, wherein the multi-carrier signal contains at least first, second, and third FM radio channels, wherein the first and second FM radio channels generate intermodulation products in the third FM radio channel;
receiving a corresponding audio output signal at the host computer from the portable electronic device; and
with the host computer, directing the portable electronic device to adjust the radio tuner so that the radio tuner tunes to a given one of the at least first, second, and third FM radio channels.

8. The method defined in claim 7 further comprising:
with the host computer, analyzing audio quality for the audio output signal while the radio tuner of the portable electronic device is tuned to the given one of the at least first, second, and third radio channels.

9. The method defined in claim 8, wherein analyzing the audio quality of the audio output signal comprises measuring a selected one of: a frequency response, a signal-to-noise ratio, a maximum output level, a total harmonic distortion plus noise level, and a crosstalk level.

10. A method of using test equipment to test a portable electronic device having a frequency modulation (FM) radio tuner with scan capabilities, comprising:
with a multi-carrier signal generator in the test equipment, providing audio test signals to the FM radio tuner in the portable electronic device simultaneously over first and second radio channels;
with a host computer in the test equipment, receiving audio output from the portable electronic device that corresponds to the audio test signals that have been received by the portable electronic device using the FM radio tuner while the FM radio tuner is tuned to the first radio channel;
with the host computer, performing audio quality analysis operations on the received audio output to ascertain how well the FM radio tuner is receiving the audio test signals over the first FM radio channel while the second FM radio channel is being simultaneously provided to the FM radio tuner; and
with the host computer, directing the portable electronic device to adjust the FM radio tuner to tune to a given one of the first and second radio channels.

11. The method defined in claim 10, wherein performing the audio quality analysis operations comprises measuring a signal-to-noise-ratio that is associated with the received audio output.

12. The method defined in claim 10 wherein the portable electronic device has automatic FM radio channel tuning capabilities,
wherein directing the portable electronic device to use the FM radio tuner to tune to the given one of the first and second radio channels comprises directly the portable electronic device to automatically scan for an available FM radio channel while the first and second radio channels are being simultaneously provided to the FM radio tuner.

13. The method defied in claim 12 wherein the audio test signals include signals at multiple audio frequencies and wherein performing the audio quality analysis operations comprises making audio frequency response measurements on the received audio output.

14. The method defined in claim 12 wherein providing the audio test signals to the FM radio tuner in the portable electronic device simultaneously over the first and second radio channels comprises providing the audio test signals to the FM radio tuner in the portable electronic device simultaneously over first and second FM radio channels in a frequency band ranging from 76 MHz to 108 MHz.

15. The method defined in claim 10, wherein providing the audio test signals to the FM radio tuner in the portable electronic device simultaneously over the first and second radio channels comprises providing the audio test signals to the FM radio tuner in the portable electronic device simultaneously over first and second FM radio channels in a frequency band ranging from 76 MHz to 108 MHz.

16. The method defined in claim 10, wherein performing the audio quality analysis operations comprises making a maximum output measurement on the received audio output.

17. The method defined in claim 10, wherein performing the audio quality analysis operations comprises making a crosstalk measurement on the received audio output.

18. The method defined in claim 10, wherein performing the audio quality analysis operations comprises making a total harmonic distortion plus noise level measurement on the received audio output.

* * * * *

UNITED STATES PATENT AND TRADEMARK OFFICE
CERTIFICATE OF CORRECTION

PATENT NO. : 8,437,715 B2
APPLICATION NO. : 12/693303
DATED : May 7, 2013
INVENTOR(S) : Jason A. Flickinger et al.

Page 1 of 1

It is certified that error appears in the above-identified patent and that said Letters Patent is hereby corrected as shown below:

In the Claims:

In claim 12, column 12, line 17, delete "directly" and insert -- directing --

In claim 13, column 12, line 22, delete "The method defied" and insert -- The method defined --

Signed and Sealed this
Second Day of July, 2013

Teresa Stanek Rea
*Acting Director of the United States Patent and Trademark Office*